United States Patent
Curran et al.

(10) Patent No.: US 6,768,365 B2
(45) Date of Patent: Jul. 27, 2004

(54) LOW POWER REDUCED VOLTAGE SWING LATCH

(75) Inventors: Brian W. Curran, Saugerties, NY (US); Edward T. Malley, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/274,191

(22) Filed: Oct. 18, 2002

(65) Prior Publication Data

US 2004/0075483 A1 Apr. 22, 2004

(51) Int. Cl.[7] .................................................. G06F 1/04
(52) U.S. Cl. ...................................... 327/291; 327/295
(58) Field of Search ................................ 327/249, 251, 327/291, 293, 295, 292, 108, 112; 365/189.11; 326/93, 95, 85, 86

(56) References Cited

U.S. PATENT DOCUMENTS

| | | | | |
|---|---|---|---|---|
| 5,187,686 A | * | 2/1993 | Tran et al. | 365/189.11 |
| 5,329,176 A | * | 7/1994 | Miller et al. | 326/21 |
| 5,751,176 A | * | 5/1998 | Sohn et al. | 327/295 |
| 6,208,186 B1 | * | 3/2001 | Nair | 327/199 |

* cited by examiner

Primary Examiner—Linh M. Nguyen
(74) Attorney, Agent, or Firm—Lynn L. Augspurger

(57) ABSTRACT

An improved clocking circuit is provided for generating a half swing clock. Previous circuit operations required an additional supply voltage rail (Vdd/2), but the preferred embodiment exploits charge sharing to generate a half swing clock with less power and without the additional supply voltage rail. To drive clock nodes to Vdd/2, a shunt transistor is opened, and the fully charged clock node shares its charge with the fully discharged clock node. When capacitances have been properly matched, both nodes will settle at Vdd/2.

5 Claims, 2 Drawing Sheets

Half swing LCB and latch with charge sharing shunt

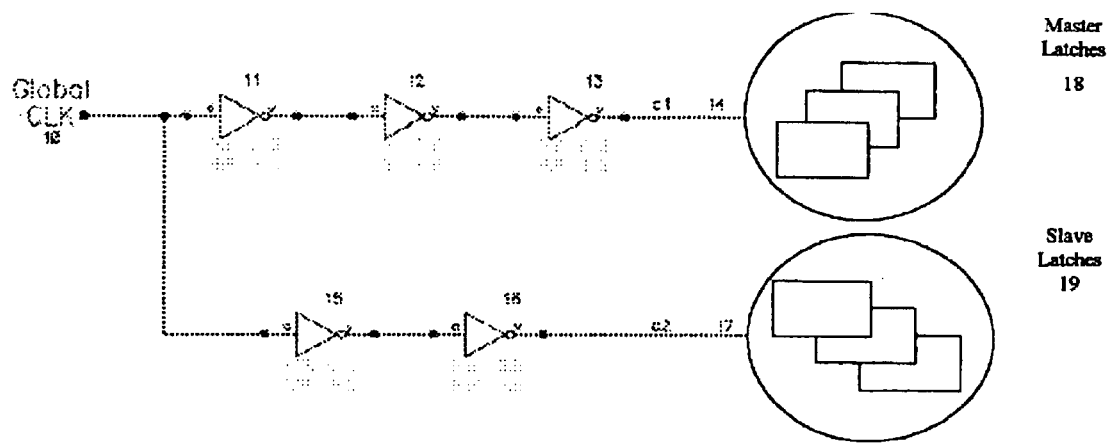
Figure 1: Prior art LCB and latch
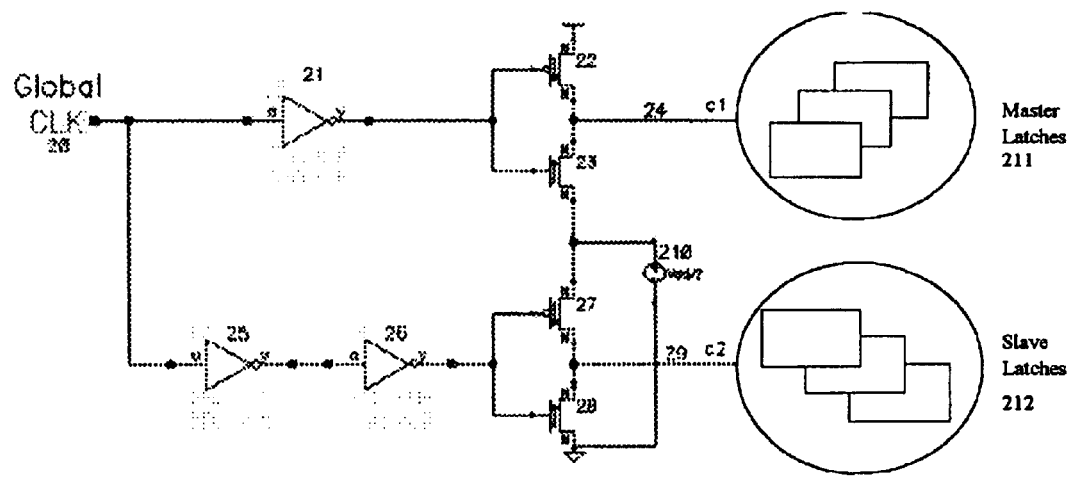
Figure 2: Prior art half swing LCB2 and latch

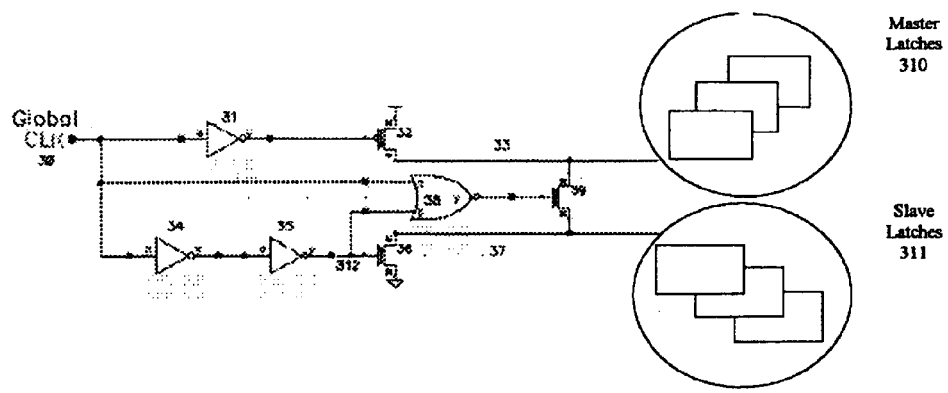
Figure 3: Half swing LCB and latch with charge sharing shunt
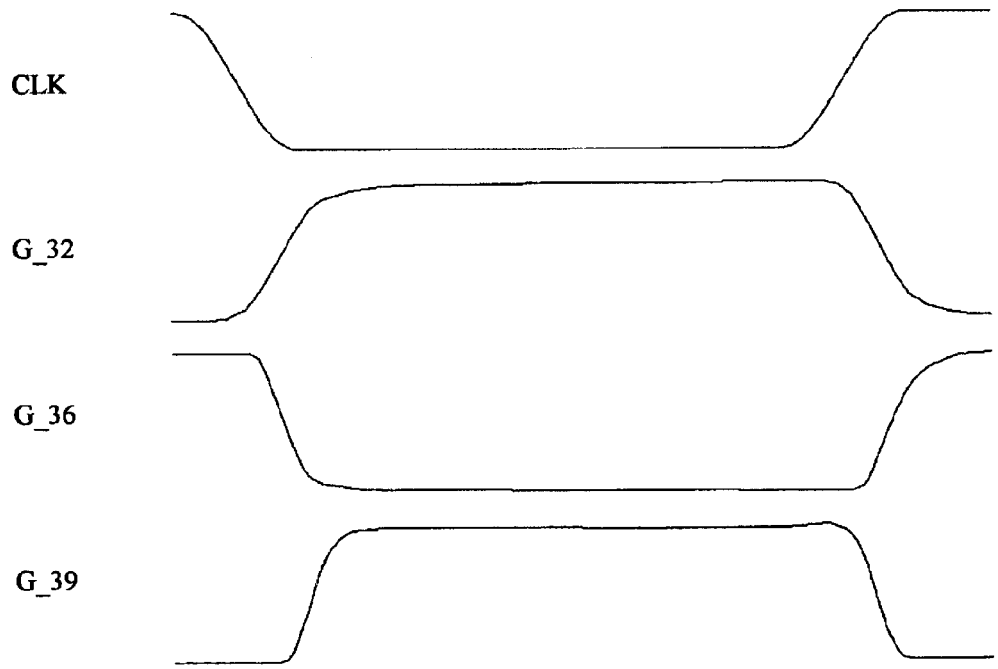
Figure 4: LCB with charge sharing shunt's timing

LOW POWER REDUCED VOLTAGE SWING LATCH

FIELD OF THE INVENTION

This invention relates to local clock distribution and low power circuit design.

Trademarks: IBM® is a registered trademark of International Business Machines Corporation, Armonk, N.Y., U.S.A. Other names may be registered trademarks or product names of International Business Machines Corporation or other companies.

BACKGROUND

In modern CMOS microprocessors, an important new design obstacle has begun to emerge. Circuits cannot simply be optimized for delay—power consumption is now an additional critical parameter. In modern CMOS microprocessors, a significant portion of the power is dissipated in the clock distribution network, specifically in the local clock nets which drive the latches. With feature sizes decreasing and scale of integration increasing, this problem will continue to worsen. Thus, it can be concluded that improvements in clock distribution techniques, especially local clock distribution, have the potential to lead to major power savings in CMOS microprocessors.

SUMMARY OF THE INVENTION

This invention exploits the direct proportionality of power consumption to the square of the voltage swing and locally distributing a half swing clock to the latches, thereby yielding a 75% decrease in local clock power. In accordance with the preferred embodiment of the invention an improved circuit is provided for generating a half swing clock. Previous circuit operations required an additional supply voltage rail (Vdd/2), but in accordance with the invention, the preferred embodiment exploits charge sharing to generate the half swing clock with less power and without the additional supply voltage rail. To drive clock nodes to Vdd/2, a shunt transistor is opened, and the fully charged clock node shares its charge with the fully discharged clock node. If capacitances have been properly matched, both nodes will settle at Vdd/2.

These and other improvements are set forth in the following detailed description. For a better understanding of the invention with advantages and features, refer to the description and to the drawings.

DESCRIPTION OF THE DRAWINGS

FIG. 1 illustrates a prior art LCB (local clock block) and latch.

FIG. 2 illustrates a prior art half swing LCB and latch.

FIG. 3 illustrates the half swing LCB and latch with a charge sharing shunt.

FIG. 4 illustrates the half swing LCB and latch with a charge sharing shunt timing.

Our detailed description explains the preferred embodiments of our invention, together with advantages and features, by way of example with reference to the drawings.

DETAILED DESCRIPTION OF THE INVENTION

Referring to FIG. 1, the prior-art clock block simply distributes and repowers a global clock to master and slave latches. The global clock 10 is repowered by inverters 11, 12 and 13 to create a local c1 clock 14 which is inverted with respect to the global clock 10. Global clock 10 is also repowered by inverters 15 and 16 to create a local c2 clock 17 which is not inverted with respect to the global clock 10. The local c1 clock 14 is driven through local wires to the local master latches 18. The local c2 clock 17 is driven through local wires to the local slave latches 19.

Referring to FIG. 2, the prior-art half swing clock block behaves similar to the full swing version with the exception of the final buffer stage. Now, inverters 13 and 16 have been replaced with half swing inverters, that is, transistors 22 and 23 make up an inverter that swings from Vdd/2 to Vdd, and transistors 27 and 28 make up an inverter that swings from 0 to Vdd/2. These drivers generate local c1 clock 24 and local c2 clock 29 respectively, which are driven via local wires to the appropriate latch inputs.

Referring to FIG. 3, the half swing clock block with a charge sharing shunt is functionally similar to the prior-art half swing clock block, but the circuit structure is different. Vdd/2 source 210, PFET 27, and NFET 23 have been removed. Instead, NOR gate 38 and NFET 39 have been added. Now, when global clock 30 is high, inverter 31 drives a 0 onto the gate of PFET 32, opening it and driving a 1 onto local c1 clock 33. Similarly, inverters 34 and 35 drive a 1 onto the gate of NFET 36, opening it and driving a 0 onto local c2 clock 37. Finally, a 1 on global clock 30 causes NOR gate 38 to evaluate to a 0, closing shunt transistor 39. When global clock 30 is driven to a 0, inverter 31 drives a 1 onto the gate of PFET 32, closing it, and inverters 34 and 35 drive a 0 onto the gate of NFET 36, also closing it. Once both the global clock 30 and node 312 have been driven low, NOR gate 38 evaluates to a 1, opening the shunt transistor 39. This causes a charge sharing event to occur, and if the capacitance is properly balanced, the charge initially on local c1 clock 33 will share equally between local c1 clock 33 and local c2 clock 37, causing both nodes to evaluate to Vdd/2. These clock nodes are driven via local wires to the appropriate master and slave latch inputs.

The invention's improvement over the prior art full swing LCB and latch is clear, since the use of the half swing clock results in significant power savings. Slightly less clear is the advantage of using this circuit over the prior art half swing LCB and latch. The prior art half swing LCB and latch uses an extra voltage source. This source consumes power whenever the clock switches, diminishing some of the power savings seen from using a half swing clock. In contrast, this invention requires no extra voltage source. As a result, once the clock nodes 33 and 37 have been precharged, no further power is consumed by the clock for the remainder of the clock cycle. This way, nearly the full 75% power savings can be observed.

The purpose of NOR gate 38 in the invention also may not be entirely clear. Referring to FIG. 4, the waveforms on nodes CLK, PFET 32's gate, NFET 36's gate, and shunt transistor 39's gate can be observed. Note that shunt transistor 39 does not turn on until after both pfet 32 and nfet 36 have been closed. Similarly, shunt transistor 39 turns off prior to pfet 32 and nfet 36 opening again. This eliminates any potential collision current from Vdd to ground, which prevents any unnecessary power consumption.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A clocking circuit for generating two phase, half voltage swing clocks, comprising:
- a global clock input,
- a pullup circuit coupled to first of said clock phases,
- a pulldown circuit coupled to second of said clock phases, and
- a shunt circuit coupled to said first clock phase and said second clock phase, wherein the shunt circuit exploits charge sharing to generate said half swing clocks wherein the shunt circuit consists of
- a logic gate,
- a shunt node, and
- a shunt device,
- wherein said global clock input and said delayed clock node are coupled to said logic gate, wherein said logic gate is coupled to said shunt node, wherein said shunt node is coupled to said shunt device, and wherein said shunt device is coupled to said first clock phase and said second clock phase.

2. The clocking circuit according to claim 1 wherein said pullup circuit consists of
- an inverter,
- a first voltage rail,
- an inverted clock node, and
- a PFET pullup device,
- wherein said global clock input is coupled to said inverter, wherein said inverter is coupled to said inverted clock node, and wherein said inverted clock node is coupled to said PFET pullup device, and wherein said PFET pullup device is coupled to said first voltage rail and said first clock phase.

3. The clocking circuit according to claim 2 wherein said pulldown circuit consists of
- a non-inverting buffer,
- a second voltage rail,
- a delayed clock node and
- a NFET pulldown device,
- wherein said global clock input is coupled to said non-inverting buffer, wherein said non-inverting buffer is coupled to said delayed clock node, wherein said delayed clock node is coupled to said NFET pulldown device, and wherein said NFET pulldown device is coupled to said second voltage rail and said second clock phase.

4. The clocking circuit according to claim 3 wherein the voltages on the said first clock phase and said second clock phase are equalized when said shunt device turns ON.

5. The clocking circuit according to claim 4 wherein the said equalized voltages of said first clock phase and said second clock phase are approximately equal to the average voltage of the said first voltage rail and said second voltage rail.

* * * * *